Nov. 20, 1962     E. C. WARRICK ET AL     3,064,487
ECCENTRICALLY ADJUSTABLE PULLEY ADAPTOR
Original Filed Nov. 9, 1956
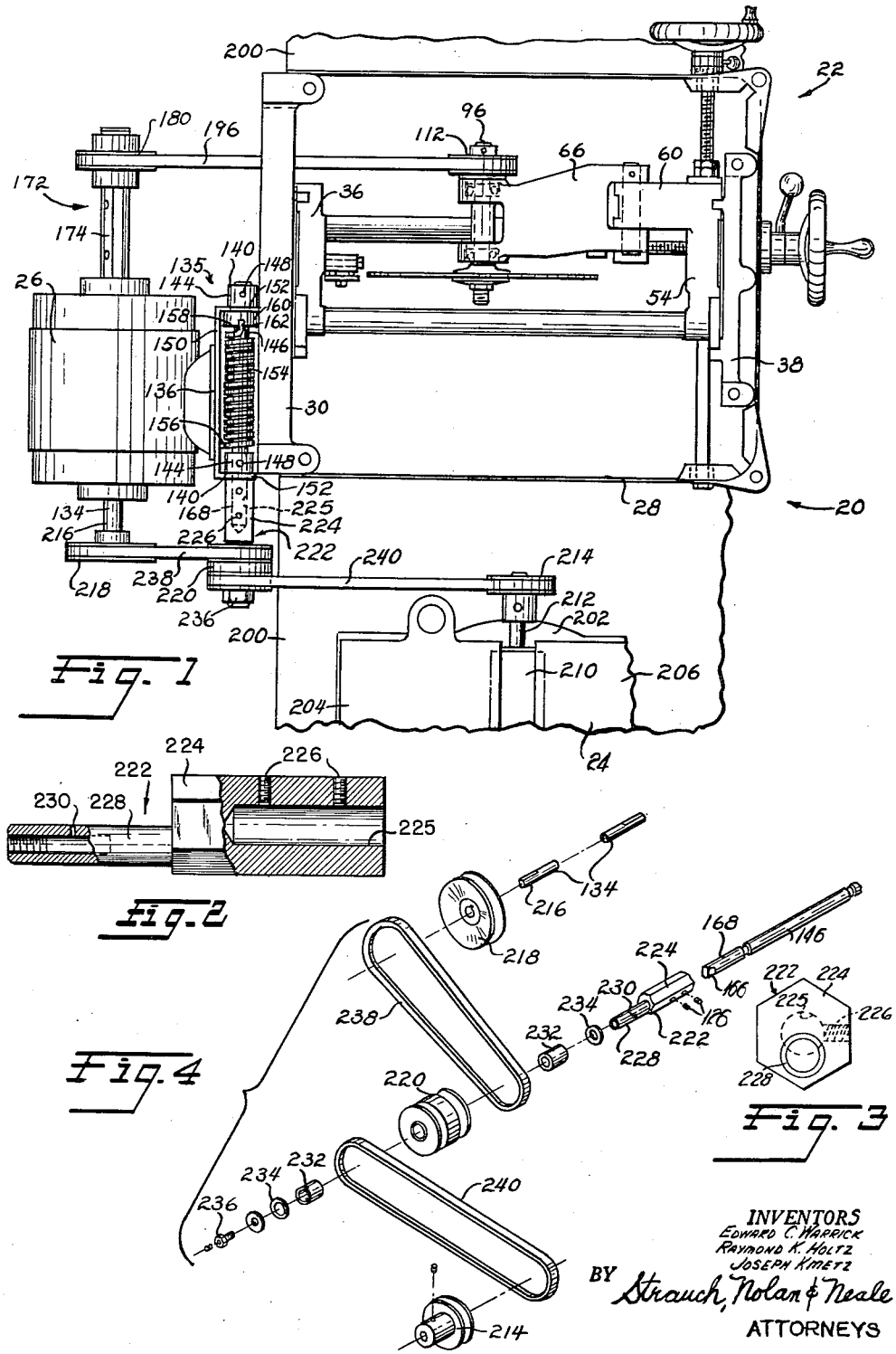
INVENTORS
EDWARD C. WARRICK
RAYMOND K. HOLTZ
JOSEPH KMETZ
BY Strauch, Nolan & Neale
ATTORNEYS United States Patent Office 3,064,487
Patented Nov. 20, 1962

3,064,487
ECCENTRICALLY ADJUSTABLE PULLEY ADAPTOR
Edward C. Warrick, Raymond K. Holtz, and Joseph Kmetz, Pittsburgh, Pa., assignors to Rockwell Manufacturing Company, Pittsburgh, Pa., a corporation of Pennsylvania
Original application Nov. 9, 1956, Ser. No. 621,458, now Patent No. 2,956,595, dated Oct. 18, 1960. Divided and this application Aug. 11, 1960, Ser. No. 48,935
4 Claims. (Cl. 74—242.16)

This invention relates to an eccentrically adjustable pulley adaptor which has been developed in connection with a combination drive arrangement for a tilting arbor circular saw and jointer having belt drive connections to a common motor shaft. This application is a division of co-pending application Serial No. 621,458 filed November 9, 1956, now Patent No. 2,956,595.

In shop practice it is desirable to have a circular saw and planer or jointer in close proximity, often the latter tool being used to smooth the edge of a work piece immediately after the piece has been sawed. The two tools in practice could thus be maintained in simultaneous, dual motor operation or, alternatively, each must be intermittently turned on and off.

To satisfy the need for substantially conjoint operation of a circular saw and a second tool, hereinafter referred to as the jointer (a preferred type of second tool) this invention enables the use of a single motor to drive a tilting arbor saw and a jointer, wherein the motor is pivotally mounted in combination with a spring counterbalance on the table saw body, the motor shaft and motor pivot mount being disposed parallel to the vertical plan through the saw arbor axis and a drive pulley mounted on each end of the motor shaft. One of the pulleys, the one used to drive the saw arbor, is an axially floating drive pulley which can shift to follow the movement of the tilting arbor pulley. Proper tension on the saw drive belt is maintained by the overhanging, spring counterbalanced arrangement of the motor relative to its pivot mount. The second drive pulley is secured in fixed position to the motor shaft and drives the jointer through an intermediate transfer or idler pulley journalled on a stud shaft which is mounted on the motor pivot in a manner permitting eccentric adjustment to maintain a substantially proper tension in the jointer drive belt. This eccentric stud shaft mount device provides the basis for the invention in this application.

Accordingly, a primary purpose of this invention resides in providing a novel transfer pulley eccentric journal stud adaptor for attachment to a base support shaft of a drive motor with provision for eccentric adjustment of the journal stud around the axis of the base support shaft.

A further object resides in the provision of a novel idler pulley adjustment adaptor having a base member with an axial bore adapted to fit on and be fastened to a support shaft or a rod, the base member carrying a journal stud which is eccentrically disposed to the axis of the bore in the base member.

Still another object resides in the provision of the novel adaptor of the preceding object having the journal stud provided with a coaxial blind bore and cross passages extending from the blind bore to the exterior of the stud.

Further novel features and objects of this invention will become apparent from the following detailed description and the appended claims taken in conjunction with the accompanying drawings showing preferred embodiments thereof, in which:

FIGURE 1 is a top plan view of a tilting arbor saw and jointer combination in which the present invention is incorporated, portions of the saw and the jointer being broken away for clarity;

FIGURE 2 is an elevational side view of the pulley stud adaptor, partially broken away;

FIGURE 3 is an end view of the pulley adaptor; and

FIGURE 4 is an exploded perspective view of the pulleys, belts and motor mount shaft of the saw-jointer combination shown in FIGURE 1, with various tool and motor portions omitted.

The combination saw-jointer 20 (see FIGURE 1) is used as an example of the utility of the pulley adjustment adaptor in a combination tilting arbor circular table saw 22 and jointer 24 disposed side by side with the saw arbor axis and jointer arbor axis disposed to be in the same, or parallel, vertical planes. The two tools are powered by a single electric motor 26 mounted on the table saw frame, in a manner to be later described, with the motor axis arranged horizontal and parallel to the jointer arbor axis and with the motor fixed against lateral shifting movement, in a direction parallel to its shaft axis.

With general reference to FIGURE 1 and noted reference to other figures, the support for table saw 22 consists of a cabinet 28, forming the front and two side walls, a rear trunnion bracket 30, a front trunnion bracket 38, a saw table (not shown) and rear and front trunnions, 36 and 54 respectively, spaced and rigidly joined to form a tilting frame.

Extending rearwardly from the upper portion of front trunnion 54 is an arbor bracket journal boss 60, providing a pivotal mount for the saw arbor bracket 66 to enable elevation adjustment of the saw arbor assembly and blade, while the trunnion mounts enable tilting of the arbor 96.

Regardless of the elevational adjustment of the blade, tilting occurs about an axis through the blade plane and lying along the top surface of the saw table. Elevation changes raise and lower the arbor pulley 112, swinging the arbor axis in a fore and aft arc and tilt changes swing the arbor pulley 112 and its axis in a lateral arc. Combinations of elevation and tilt can result in an infinite number of arbor pulley positions and the drive arrangement between motor 26 and the arbor pulley 112 must be able to adapt to all pulley positions and still maintain proper belt disposition and tension. Further details of the table saw are not necessary for the understanding of the present invention, but if desired, reference may be made to parent application Serial No. 621,458 (Patent No. 2,956,595).

The Motor Mount is shown assembled in the top view of FIGURE 1. The electric motor 26, with both ends of the motor shaft 134 projected from the motor housing, is fastened through a motor bracket assembly 135 to the lower edge of the rear trunnion bracket 30 with the motor base plate 136 facing the trunnion bracket.

Motor bracket 135 includes an adjustable torsion spring counterbalance arrangement contributing toward a rugged, compact and easily adjustable mounting unit. To afford a rigid support for the motor, two motor base mount members 140 are fastened on a flange formed on the lower edge of the rear trunnion bracket 30 by screws. Base mounts 140 are laterally spaced and, considered as a unit, are offset to one side of the table saw 22. Each mount 140 has a rearwardly disposed collar 144 and a motor base support shaft 146 is supported in the collars 144 and non-rotatably fixed by set screws 148 located in both collars.

The motor base support shaft 146 retains a motor hinge plate 150 on the two base mounts 140 by passing through apertured bent ears 152 on the ends of the hinge plate. Also carried on support shaft 146 is a spiral torsion spring 154 with one end 156 terminating in a substantially tangential projection to a position under the motor hinge plate 150, the other end 158 being bent to provide a short axially directed portion. A spring load collar 160, with a notch 162 on one side, is fastened, by a spring type pin, on motor support shaft 146 between hinge plate ears 152 with the axially bent spring end 158 received in notch 162. Collar 160 and torsion spring 154 occupy the axial space between the right hand hinge plate ear 152 and the left hand motor base mount 140. This arrangement positions the tangential end 156 of the torsion spring as close as possible to the center of motor 26. The lower edge of the motor base plate 136 is fastened by screws to the hinge plate 150.

Motor support shaft 146, being non-rotatably secured in the base mounts 140 by the set screws 148, and bent end 158 of torsion spring 154 being non-rotatable relative to shaft 146 by reason of its cooperation with spring load collar 160, movement of the motor 26 and its hinge plate 150 away from the table due to the weight of the motor will be resisted by the torsional loading through end 156 of spring 154.

Torsion spring preload, to counterbalance the weight of motor 26 in adjusting drive belt tensions, can be adjusted by loosening set screws 148 in the base mounts 140 and rotating the support shaft 146 by means of a suitable tool engaging the shaft end flats 166 (FIGURE 4). When the desired torsion counterbalance is realized, the set screws 148 are tightened to again non-rotatably fix the support shaft 146. The left hand end 168 of support shaft 146 (FIGURE 1) extends a short distance beyond the side of saw table cabinet 28 for a purpose to be hereinafter described.

The floating pulley assembly 172, within reason, can be adapted to fit any diameter motor shaft and details are not necessary for an understanding of the present invention. Briefly, the pulley 112 is drive connected to a floating pulley 180 on the pulley assembly 172 by a V-belt 196, preferably having a steel cable core, and shifting of the arbor pulley position causes the floating pulley 180 to axially position itself along the shaft extension 174. Saw drive belt tension is maintained by the weight of motor 26, suitably counterbalanced by the torsion spring 154.

Again referring to FIGURE 1, the jointer 24 is mounted on a support such as bench 200 closely adjacent the table saw 22. The jointer has a bed 202, adjustable table 204, adjustable front table 206 and other elements. The rotating cutter head 210 and the cutter head arbor 212 are journalled in the jointer bed 202 on an axis parallel to that of motor shaft 134 with the jointer pulley 214 disposed on the end of arbor 212 between the jointer 24 and table saw 22.

The drive power for the jointer cutter head is derived from the projected end 216 of the motor shaft 134, opposite to the floating pulley extension shaft end of the motor shaft. A driving pulley 218 is keyed on motor shaft end 216 and is retained by a set screw.

To provide a drive connection between motor pulley 218 and jointer arbor pulley 214, which will be essentially unaffected by the changing pivotal position of motor 26, a relatively small diameter, double sheave intermediate transfer or idler pulley 220 is journalled on an adaptor 222.

Adaptor 222 has a sleeve-like base portion 224 which is provided with a bore 225 enabling the base 224 to fit over the projected end 168 of the motor base shaft 146, the base then being non-rotatably fixed thereto by set screws 226. Integral with the adaptor sleeve 224 but eccentric to the sleeve axis (FIGURE 2) is a pulley journal stud 228 which is hollow and has a cross passage 230 to lubricate the double sheave pulley bearings 232 (FIGURE 4) which can be oilite bushings. Double sheave pulley 220, oilite bushings 232 and fibre washers 234 are retained on the journal stud 228 by a steel washer and hollow cap screw 236. Lubricant can be introduced to bushings 232 through cap screw 236, the hollow stud 228 and cross passage 230.

The motor pulley 218 and one sheave of the transfer pulley 220 are drive connected by a V-belt 238 and a further V-belt 240 drive connects the other sheave of the transfer pulley 220 and jointer arbor pulley 214. Both V-belts can if desired be of similar construction to the V-belt 196 but they are not subject to as much stress and strain.

As previously described, the motor base shaft 146 is non-rotatably fixed by setscrews to the table saw 22. This provides a fixed mount for the transfer pulley adaptor 222, and after the motor base shaft 146 is adjusted and set to provide correct torsion spring counterbalance, the adaptor 222 can be rotatably adjusted on shaft 146 to eccentrically shift the transfer pulley stud 228. This latter adjustment is to enable a desired tension in the long V-belt 240 leading from transfer pulley 220 to the relatively small diameter fixed axis jointer pulley 214 and the drive V-belt 238. Once these tensions are obtained, the tension in belt 240 will be fixed and unaffected by pivoting of the motor about its support axis, resulting from changes in the tilting arbor saw axis and, although the tension in V-belt 238 will vary slightly due to swinging of the motor about its support axis, the tension change is of negligible effect in the jointer drive assembly because the change in center to center distance between the axis of the motor shaft and pulley 220 is very small compared with the average center to center distance.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A belt tightener comprising: a unitary idler pulley adaptor comprising an elongate base means with a bore therein to closely rotatably fit the end of a support shaft, said base means having a non-circular exterior profile in cross section transverse to the axis of said base, and a stub shaft projecting from one end of an integral with said base member and with its axis parallel with but eccentric to the axis of the bore in said base member, said stub shaft being disposed within the exterior peripheral contour of said base member as viewed in an axial direction; and means on said base member to adjustably non-rotatably fix said base member on a support shaft.

2. The belt tightener as defined in claim 1, including an idler pulley rotatably mounted on said stub shaft, and means secured to said stub shaft axially maintaining said idler pulley on said stub shaft.

3. The belt tightener as defined in claim 2, wherein said stub shaft includes a coaxial blind bore with threads at its open end and at least one cross passage extending from said blind bore through the stub shaft; and said means on the end of said stub shaft comprises a headed screw, with an axial through bore, threaded in the end of said stub shaft and closure means are provided for said through bore in said headed screw.

4. The combination as defined in claim 3, wherein oilite sleeve bushing means are disposed between said pulley and said stub shaft.

References Cited in the file of this patent

UNITED STATES PATENTS

| | | |
|---|---|---|
| 1,171,347 | Morse | Feb. 8, 1916 |
| 1,226,867 | Dempsey | May 4, 1917 |
| 1,549,845 | Munz | Aug. 18, 1925 |
| 1,577,643 | Jorgensen et al. | Mar. 23, 1926 |
| 2,073,704 | Mitchell | Mar. 16, 1937 |
| 2,258,465 | Mullaney | Oct. 7, 1941 |
| 2,909,074 | Scheiterlein | Oct. 20, 1959 |

FOREIGN PATENTS

| | | |
|---|---|---|
| 198,170 | Great Britain | May 31, 1923 |
| 531,440 | Germany | July 30, 1931 |
| 70,758 | Denmark | Mar. 20, 1950 |

UNITED STATES PATENT OFFICE
CERTIFICATE OF CORRECTION

Patent No. 3,064,487  November 20, 1962

Edward C. Warrick et al.

It is hereby certified that error appears in the above numbered patent requiring correction and that the said Letters Patent should read as corrected below.

Column 4, line 57, for "an" read -- and --; column 5, line 8, for "May 4, 1917" read -- May 22, 1917 --; column 6, under the heading "UNITED STATES PATENTS" add the following:

369,364    Putnam------------Sept. 6, 1887
  1,081,286    German------------Dec. 9, 1913 same column 6, under the heading "FOREIGN PATENTS", add the following:

158,11    Australia--------Aug. 6, 1954

Signed and sealed this 22nd day of October 1963.

(SEAL)
Attest:

ERNEST W. SWIDER
Attesting Officer

EDWIN L. REYNOLDS
Acting Commissioner of Patents